United States Patent Office 2,745,780
Patented May 15, 1956

2,745,780

ACARICIDE COMPOSITION CONTAINING 4.4'-DI-CHLOROBENZILIC ACID ESTERS

Franz Häfliger, Basel, Switzerland, assignor to J. R. Geigy A. G., Basel, Switzerland, a Swiss firm No Drawing. Application November 29, 1951,
Serial No. 258,997

Claims priority, application Switzerland May 8, 1951

10 Claims. (Cl. 167—30)

It has been found that .4'-dichlorobenzilic acid esters of the general formula:

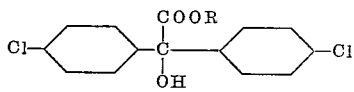

wherein R represents an alkyl, alkenyl, halogen alkyl, alkoxyalkyl, cycloalkyl or cycloalkenyl radical have a very good acaricidal and insecticidal activity and are excellently suitable as active ingredients for the production of agents for combatting pests and especially for controlling mites.

The methyl ester of 4.4'-dichlorobenzilic acid is known, the higher esters can also be easily obtained according to a part of the usual esterification methods from 4.4'-dichlorobenzilic acid ester. As 4.4'-dichlorobenzilic acid esters according to the above general formula may be listed: the ethyl ester (B. P.$_{0.01}$146–148°), the n-propyl ester (B. P.$_{0.01}$151–153°), the isopropyl ester (B. P.$_{0.05}$148–150°), the alkyl ester, chlorethyl ester, methoxyethyl ester, ethoxyethyl ester and the cyclohexyl ester.

The mode of application of the new compounds depends entirely on the intended use. The active compounds can be used in suitable solvents or diluents, in the form of emulsions or dispersions, on favourable solid carriers, in ordinary or synthetic soaps, washing agents, dispersing agents, etc. They can also be used together with other acaricidal, insecticidal, ovicidal, fungicidal, and/or bactericidal compounds or with inactive additives.

Concentrations of about 0.05–1% are sufficient for use in dilute liquid preparations to combat mites successfully; in dusting agents, concentrations of about 1–5% are sufficient. However, higher concentrations may be used in each case as the substances have no harmful effect on plants.

Different inert porous and pulverulent carriers of inorganic or organic nature come into consideration as solid carriers which are suitable for the preparation of pulverulent preparations, such as for example, tricalcium phosphate, calcium carbonate, in the form of whiting or ground limestone, kaolin, bole, bentonite, talcum, powdered magnesia, kieselguhr, boric acid; also powdered cork, powdered wood and other fine powdery materials of a vegetable nature are suitable carriers. The active ingredient is mixed with the carrier, e. g., by grinding together; or the inert carrier can be impregnated with a solution of the active ingredient in a volatile solvent, after which the solvent is removed by heating or by suction under reduced pressure. By the addition of wetting and/or dispersion agents such pulverulent preparations can also become capable of being wetted with water, so that stable suspensions can be obtained, which can be used as sprays in plant protection.

Inert spray base solvents suitable for the production of liquid preparations should not be easily inflammable and should be as odourless and as non-toxic as possible to man and beast when used properly. They should also not change the active ingredient and not corrode the containers in which they are stored. As suitable solvents come into consideration: on the one hand oils with a high boiling point, e. g. of plant, animal or mineral origin such as castor oil, paraffin oil and so on; on the other hand lower boiling hydrocarbons with a flash point of at least 30° C. such as e. g. hydrogenated naphthalenes, alkylated naphthalenes, solvent naphtha, petroleum distillates of the kerosene type etc. Naturally, a mixture of solvents can be used. The solutions are produced in the usual way, if desired with the aid of solubility promoters.

Other liquid forms of application are emulsions or suspensions of the active ingredient in water or other suitable inert solvents, or concentrates for the preparation of such emulsions which can be prepared directly at the site of operation by dilution to the desired concentration. For this purpose, the active ingredient is mixed with a dispersing or emulsifying agent. The active ingredient can also be dissolved or distributed in a suitable inert solvent and at the same time or later can be mixed with a dispersing or emulsifying agent. By the dilution of such concentrates, e. g. with water, ready to use emulsions or suspensions are obtained. With suitable concentration and mixing proportions of the active ingredient, emulsifying agent and water, clear, completely stable watery solutions (emulsoids) are obtained.

Various capillary active substances with an anion or cation active or non-ionogenic component may be used as dispersing or emulsifying agents. There may be enumerated, for example, natural or synthetic soaps, Turkey red oil, fat alcohol sulphonates, sulphonated fats and fatty acid esters, etc., also higher molecular quaternary ammonium compounds, furthermore condensation products from aliphatic or araliphatic compounds and ethylene oxide, e. g. the condensation product from stearin alcohol and ethylene oxide.

The active ingredient can also consist of one or more compounds of the defined formula. It can also be combined for use with other acaricidal, insecticidal, ovicidal, fungicidal or bactericidal substances. Of these may be enumerated, for example, benzylbenzoate, dimethylthianthrene, phthalonitrile, $\alpha,\alpha$-bis-(chlorophenyl)-$\beta,\beta,\beta$-trichlorethane or -$\beta,\beta$-dichlorethane, 1.2.4.5.6.7.8.8-octachloro-3a.4.7.7a - tetrahydro - 4.7 - methano-indane, diethyl-p-nitrophenyl-thiophosphate, 5.5 - dimethyl-dihydroresorcinol-dimethyl carbamate, dinitrocresol, nitrated naphthylamines, mercury compounds or inorganic substances such as copper compounds, sublimate, sulphur, etc. In this way, combined products with a wide range of activity are obtained.

Further it is also possible to use the active ingredient in the form of aerosols. In this case the active ingredient is dissolved or dispersed in a solvent such as Freon, which boils under atmospheric pressure below room temperature, if desired with the aid of suitable inert diluents as liquid carrier. In this way, compressed solutions are obtained which in spraying will yield aerosols which are particularly suitable for combatting mites in closed rooms, greenhouses, grain silos and other storing places.

As further additives which can be mixed with the forms of application mentioned, can be enumerated: adhesive substances such as casein, fatty acid salts, glue, resins, fats, albumen degradation products, wetting agents; solubility promoters, dyestuffs, attractives; with pulverulent preparations, also dust binding agents, etc.

It is, therefore, possible by the choice of various extenders and additives to obtain a compound with a composition and dependent properties which make it suitable for a specially intended use. So, dips, sprinkling agents and spraying agents in the form of emulsions or suspensions and also emulsions and suspensions for general use and concentrates for their preparation can be prepared. The enumerated substances are mostly liquid preparations. Of solid preparations can be mentioned: dusting agents, dry powder, strewing agents and also solid soap preparations which can be employed in the form of moulded pieces.

The agents for combating mites can be used according to the usual methods of application. The mites or the object to be treated or to be protected against attack by mites, in particular plants, also for example, roots, root nodules, drugs, textiles, packing materials, grains, dried fruits, stores of human and cattle foods, seeds, wood, leather, skins, paper, furs, hair, feathers, objects of all kinds, wall papers, walls, floors, can be treated with the active component or the described agents respectively, be it by dusting, strewing, sprinkling, painting, smearing, impregnating or by bringing them into or surrounding them by an atmosphere containing the active substance, as smoke, steam or aerosol, or by other suitable methods.

Various modes of preparation of mite combating agents and their use are described in the folowing examples. The parts are given throughout by weight.

*Example 1*

1–5 parts of active ingredient, e. g. 4.4′-dichlorobenzilic acid ethyl ester are rubbed and ground with 99.95 parts of talc until the active substance is evenly distributed throughout the carrier. The active substance dissolved in a solvent, e. g. 50 parts of acetone, can also be mixed with talc and then the solvent may be removed by evaporation. The dusting agent so prepared has a good action against the imagines and larvae of the red spider, e. g. Paratetranychus pilosus, Tetranychus urticate, etc.; it can also be used to control ticks. A similar action is obtained if a mixture of talc, kaolin and ground limestone is used as carrier.

*Example 2*

10 parts of active ingredient are homogeneously ground with 80 parts of carrier and 10 parts of auxiliary substance. Kaolin, bentonite, chalk, etc. can be used as carriers and, for example, sulphite waste liquor, the sodium salt of dibutylnaphthalene sulphonic acid and also other wetting and adhesive agents can be used as the auxiliary substance. Such an agent suspended in water and used as a spray in concentrations of 0.1–1% has a good action against the imagines and larvae of the red spider.

*Example 3*

25 parts of active ingredient are dissolved in 67 parts of xylene and mixed with 8 parts of a mixture of ethylene oxide condensation products, e. g. alkylated phenols and ethylene oxide. After dilution to 0.05–0.5% with water, emulsions with a good effect against the imagines and larvae of the red spider are obtained.

*Example 4*

20 parts of technical dichlorodiphenyltrichloroethane and 4 parts of 4.4′-dichlorobenzilic acid ethyl ester are dissolved in 21 parts of xylene. 5 parts of resin, e. g. colophonium and 9.5 parts of softening agent such as phthalates or fatty acids are then added. The mixture is then emulgated with 11.5 parts of an emulgator such as soaps of fatty acids or resin acid and 29 parts of water. This emulsion concentrate can be diluted and used in the same way as that described in Example 3.

*Example 5*

1–5 parts of active ingredient are dissolved in 99.95 parts of kerosene (boiling point 180–220°), to produce a spray with an acaricidal action.

*Example 6*

2 parts of active ingredient, 10 parts of bentonite, 10 parts of sulphite waste liquor, 5 parts of the sodium salt of dibutylnaphthalene sulphonic acid and 73 parts of finely ground sulphur are homogeneously mixed. The preparation, in 0.5–1% aqueous suspensions, can be used simultaneously for the control of fungi diseases and red spiders. Analogous combinations are possible with other inorganic and organic fungicides.

*Example 7*

1 part of active ingredient is homogeneously ground with 5 parts of $\alpha.\alpha$-bis-(chlorophenyl)-$\beta.\beta.\beta$-trichloroethane and 94 parts of talc. This mixture as well as similar combinations, e. g. with 5.5-dimethyl-dihydroresorcinol-dimethyl carbamate or other contact insecticides or also fungicides, are excellently suitable for the simultaneous control of red spiders, injurious insects and fungi diseases.

*Example 8*

10 parts of active ingredient, 50 parts of $\alpha.\alpha$-di-p-chlorophenyl-$\beta.\beta.\beta$-trichloroethane, 3 parts of a condensation product from naphthalene sulphonic acid and formaldehyde, 5 parts of an ethylene oxide condensation product of a higher fatty alcohol, 26.5 parts of kaolin and 5.5 parts of finely distributed silicic acid are homogeneously ground together. In 0.1–1% concentrations this suspension spraying agent is excellently suitable for the simultaneous control of insects and red spiders.

What I claim is:

1. A composition for the control of acaridae comprising, as active toxic ingredient, 4.4-dichlorobenzilic acid-lower alkyl ester and, as inert diluent, an acaricide adjuvant selected from the group consisting of a pulverulent inorganic carrier, a surface-active dispersing agent which lowers the surface tension of water, and a spray oil solvent.

2. A composition for the control of acaridae comprising, as active toxic ingredient, 4.4′-dichlorobenzilic acid methyl ester and, as inert diluent, a pulverulent inorganic carrier.

3. A composition for the control of acaridae comprising, as active toxic ingredient, 4.4′-dichlorobenzilic acid propyl ester and, as inert diluent, a spray oil solvent.

4. A composition for the control of acaridae comprising, as active toxic ingredients, 4.4′.4-dichlorobenzilic acid isopropyl ester and, as inert diluent, a spray oil solvent.

5. The method of controlling acaridae, which comprises bringing the acaridae into contact with a composition for the control of mite pests comprising, as active toxic ingredient, 4.4-dichlorobenzilic acid-lower alkyl ester and, as inert diluent, an acaricide adjuvant selected from the group consisting of a pulverulent inorganic carrier, a surface-active dispersing agent which lowers the surface tension of water, and a spray oil solvent.

6. The method of controlling acaridae, which comprises bringing the acaridae into contact with a composition for the control of mite pests comprising, as active toxic ingredient, 4.4′-dichlorobenzilic acid methyl ester and, as inert diluent, a pulverulent inorganic carrier.

7. The method of controlling acaridae, which comprises bringing the acaridae into contact with a composition for the control of mite pests comprising, as active toxic ingredient, 4.4′-dichlorobenzilic acid propyl ester and, as inert diluent, a spray oil solvent.

8. The method of controlling acaridae, which comprises bringing the acaridae into contact with a composition for the control of mite pests comprising, as active toxic ingredient, 4.4′-dichlorobenzilic acid isopropyl ester and, as inert diluent, a spray oil solvent.

9. A composition for the control of acaridae comprising as active toxic ingredient 4.4′-dichlorobenzilic acid ethyl ester, and a surface active dispersing agent which lowers the surface tension of water and thereby promotes the aqueous dispersion of the active ingredient.

10. The method of controlling acaridae which comprises bringing the acaridae into contact with a composition for the control of mite and insect pests comprising as active toxic ingredient 4.4'-dichlorobenzilic acid ethyl ester, and a surface active dispersing agent which lowers the surface tension of water and thereby promotes the aqueous dispersion of the active ingredient.

References Cited in the file of this patent

"An Index of Patented Mothproofing Materials," by R. C. Roark, page 25, published 1931, by U. S. Dept. of Agric., Bureau of Chemistry and Soils.

Jour. of Eco. Entom., for December 1948, pages 875–882 (article by Metcalf).

Both references available in Div. 43 of Patent Office.